United States Patent [19]

Wactlar et al.

[11] Patent Number: 5,835,667
[45] Date of Patent: Nov. 10, 1998

[54] METHOD AND APPARATUS FOR CREATING A SEARCHABLE DIGITAL VIDEO LIBRARY AND A SYSTEM AND METHOD OF USING SUCH A LIBRARY

[75] Inventors: Howard D. Wactlar; Takeo Kanade, both of Pittsburgh; Michael L. Mauldin, Penn Hills; D. Raj Reddy; Scott M. Stevens, both of Pittsburgh; Michael G. Christel, Wexford; Michael A. Smith, Pittsburgh, all of Pa.

[73] Assignee: Carnegie Mellon University, Pittsburgh, Pa.

[21] Appl. No.: 324,076

[22] Filed: Oct. 14, 1994

[51] Int. Cl.$^6$ ....................................................... H04N 5/76
[52] U.S. Cl. ................................ 386/96; 386/97; 386/106
[58] Field of Search ..................................... 358/341, 343, 358/335, 311; 360/19.1, 13; 348/552; 369/53; 364/419; 395/2; 386/95, 96, 52, 55, 46, 105, 106, 97, 111

[56] References Cited

U.S. PATENT DOCUMENTS

| 4,905,094 | 2/1990 | Pocock et al. ........................... 358/341 |
| 5,136,655 | 8/1992 | Bronson .................................... 381/41 |
| 5,299,125 | 3/1994 | Parker et al. ............................. 364/419 |
| 5,500,920 | 3/1996 | Kupiec ....................................... 395/2 |

OTHER PUBLICATIONS

Scott Stevens et al., *Informedia—Improving Access to Digital Video*, Oct., 1994, pp. 67–71, Interactions.

HongJiang Zhang et al., *A Video Database System for Digital Libraries*, pp. 253–264, Digital Libraries, Digital Libraries Workshop DL '94, Newark, NJ.

Yoshinobu Tonomura et al., *VideoMAP and Videospacelcon: Tools for Anatomizing Video Content*, Apr. 24, 1993, pp. 131–136, Interchi '93 Conference Proceedings.

*Correlating Audio and Moving–Image Tracks*, pp. 295–296, Vol. 33, NR 10A, IBM Technical Disclosure Bulletin, Mar. 1991, U.S..

Xuedong Huang, et al., "The SPHINX–II speech recognition system: an overview"*Computer Speech and Language*, No. 2, 1993, pp. 137–148.

Scott M. Stevens, "Next Generation Network and Operating System Requirements for Continuous time Media, "*Springer–Verlag*, 1992, pp. 197–208.

Yihong Gong, et al., "An Image Database System with Content Capturing and Fast Image Indexing Abilities," *Presidings of the First Intl. Conference on Multimedia Computing and Systems*, 1994, pp. 121–130.

Yoshinobu Tonomura, et al., "Structured Video Computing," *IEEE Multimedia, Fall 1994*, pp. 34–43.

*Primary Examiner*—Thai Tran
*Assistant Examiner*—Huy Nguyen
*Attorney, Agent, or Firm*—Kirkpatrick & Lockhart LLP

[57] ABSTRACT

An apparatus and method of creating a digital library from audio data and video images. The method includes the steps of transcribing the audio data and marking the transcribed audio data with a first set of time-stamps and indexing the transcribed audio data. The method also includes the steps of digitizing the video data and marking the digitized video data with a second set of time-stamps related to the first set of time-stamps and segmenting the digitized video data into paragraphs according to a set of rules. The steps of storing the indexed audio data and the digitized video data with their respective sets of time-stamps is also provided. The method also includes the step of passing the transcribed audio data through a natural language interpreter before indexing the transcribed audio data. A method and apparatus for searching the digital library is disclosed.

34 Claims, 8 Drawing Sheets

FIG A-1 SAMPLE USER DISPLAY

FIG. A-2 SAMPLE VIDEO PARAGRAPH

METHOD AND APPARATUS FOR CREATING A SEARCHABLE DIGITAL VIDEO LIBRARY AND A SYSTEM AND METHOD OF USING SUCH A LIBRARY

BACKGROUND OF THE INVENTION

1. Field of the Invention

The present invention is directed generally to a digital video library system, and more particularly, to a system integrating speech recognition, image recognition and language understanding for creating, indexing and searching digital video libraries.

2. Description of the Background of the Invention

Vast digital libraries will soon become available on the nation's Information Superhighway as a result of emerging multimedia technologies. Those libraries will have a profound impact on the conduct of business, professional and personal activities. However, due to the sheer volume of information available, it is not sufficient simply to store information and replay that information at a later date. That, in essence, is the concept of commercial video-on-demand services, and is relatively simple. New technology is needed to create, organize, and search the vast data libraries, and then to retrieve and reuse them effectively.

Currently, even though much of broadcast television is closed-captioned, the vast majority of the nation's video and film assets are not. Because of this, any type of digital video library must employ some type of audio transcription. A number of sources of error and variability arise naturally in the context of the audio transcription. For example, broadcast video productions, whether they are documentary style interviews or theatrical productions, must record speech from multiple speakers standing in different locations. This results in speech signal quality with different signal to noise ratio properties. Further compounding the problem are the effects of different orientations of the speakers and particular reverberation characteristics of the room. Still further, as the use of table top microphones, lapel microphones, and directional boom microphones traditionally used in broadcast video productions are used as sources for audio transcription, the variability arising from differences in microphone characteristics and differences in signal to noise ratios may significantly degrade performance.

Additionally, in a typical video interview, people speak fluently. This implies that many of the words are reduced or mispronounced. Lexical descriptions of pronunciations used in conventional systems for dictation where careful articulation is the norm will not work very well for spontaneous, fluent speech. Moreover, unlike the Wall Street Journal dictation models wherein the domain limits the size and nature of the vocabulary likely to be used in sentences, audio transcriptions from broadcast video generally tend not to have such constraints. Accordingly, there are many problems and challenges presented by the audio portion of raw videotaped footage which must be addressed by any digital library system.

Likewise, there are problems and challenges presented by the video portion of raw videotaped footage. For example, to effectively store video in digital format so that it is usable, the video should be segmented. Traditional methods of segmenting involve counting frames prior to and following a time reference. That type of content-independent segmentation may result in segments which are either not complete or contain two or more concepts or scenes. Accordingly, any digital library system must be capable of segmenting the video into useful, comprehensible segments based on content.

In addition to the problems associated with creating a digital video library, there are also problems with effectively accessing the library. The two standard measures of performance in information retrieval are recall and precision. Recall is the proportion of relevant documents that are actually retrieved, and precision is the proportion of retrieved documents that are actually relevant. These two measures may be traded off one for the other, and the goal of information retrieval is to maximize them both.

Searching text typically involves searches for keywords or, in some circumstances, using limited natural language inferences. Current retrieval technology works well on textual material from newspapers, electronic archives and other sources of grammatically correct and properly spelled written content. Furthermore, natural language queries allow straight-forward description by the user of the subject matter desired. However, the video retrieval task, based upon searching transcripts containing a finite set of errors, challenges the state of the art. Even understanding a perfect transcription of the audio would be too complicated for current natural language technology.

When the modality of communication, such as multimedia, has intrinsic temporal rates associated therewith, such as audio or video, searching becomes increasingly difficult. For example, it takes 1000 hours to review 1000 hours of video. Detailed indexing of the video can aid that process. However, users often wish to peruse video similar to the manner in which they flip through pages of a book. Unfortunately, mechanisms for doing so today are inadequate. Scanning by jumping a set number of frames may skip the target information completely. Conversely, accelerating the playback of motion video to twenty (20) times the normal rate presents information at an incomprehensible speed. Even if users could comprehend such accelerated playback, it would still take six minutes to scan two hours of videotape. A two second scene would be presented in only one-tenth of a second.

Similar to the problems with searching video, there is an analogous problem with searching audio, only more acute. Playing audio fast during a scan is impractical. Beyond one and one-half (1.5) to two (2) times the normal rate, audio becomes incomprehensible because the faster playback rates shift frequencies to the inaudible ranges. While digital signal processing techniques are helpful to reduce frequency shifts, at high playback rates, those digital signal processing techniques present soundbytes much like those of an analog videodisc scan.

As one can imagine, the problem is more complicated in a multimedia scenario. The integration of text, audio, and video thus presents many obstacles which must be overcome. There are about one hundred fifty (150) spoken words per minute of an average interview video. That translates to about nine thousand (9000) words for a one hour video, or roughly fifteen pages of text. A person skimming the text may be able to find relevant sections relatively quickly. However, if one was to search for a specific topic contained in a videotaped lecture, the searching problem is acute. Even if a high playback rate of three (3) to four (4) times normal speed was comprehensible, continuous play of audio and video is a totally unacceptable search mechanism. Assuming the target information was half-way through a one hour video file, it would still take approximately seven (7) to ten (10) minutes to find.

In complex, emerging fields such as digital libraries and multimedia, it is not surprising that most of today's applications have failed to take full advantage of the information bandwidth much less the capabilities of a multimedia, digital video and audio environment. Today's designs typically employ a VCR/Video-Phone view of multimedia. In this simplistic model, video and audio can be played, stopped, their windows positioned on the screen, and, possibly, manipulated in other ways such as by displaying a graphic synchronized to a temporal point in the multimedia object. This is the traditional analog interactive video paradigm developed almost two decades ago. Rather than interactive video, a much more appropriate term for this is "interrupted video."

Today's interrupted video paradigm views multimedia objects more as text with a temporal dimension. Differences between motion video and other media, such as text and still images, are attributed to the fact that time is a parameter of video and audio. However, in the hands of a user, every medium has a temporal nature. It takes time to read (process) a text document or a still image. In traditional media, each user absorbs the information at his or her own rate. One may even assimilate visual information holistically, that is, come to an understanding of complex information nearly at once.

However, to convey almost any meaning at all, video and audio must be played at a constant rate, the rate at which they were recorded. While, a user might accept video and audio played back at 1.5 times normal speed for a brief time, it is unlikely that users would accept long periods at such playback rates. In fact, studies show that there is surprisingly significant sensitivity to altering playback fidelity. Even if users did accept accelerated playback, the information transfer rate would still be principally controlled by the system.

While video and audio data types are constant rate, continuous-time, the information contained in them is not. In fact, the granularity of the information content is such that a one-half hour video may easily have one hundred semantically separate chunks. The chunks may be linguistic or visual in nature. They may range from sentences to paragraphs and from images to scenes.

Understanding the information contained in video is essential to successfully implementing a digital video library. Returning a full one-half hour video when only one minute is relevant is much worse than returning a complete book, when only one chapter is needed. With a book, electronic or paper, tables of contents, indices, skimming, and reading rates permit users to quickly find the chunks they need. Because the time to scan a video cannot be dramatically shorter than the real time of the video, a digital video library must give users just the material they need. Understanding the information content of video enables not only finding the relevant material but presenting that information in useful forms.

Tools have been created to facilitate audio browsing which present graphical representations of the audio waveform to the user to aid identification of locations of interest. However, studies have shown that those techniques are useful only for audio segments under three minutes in duration. When searching for a specific piece of information in hours of audio or video, other search mechanisms are required. For example, in previous research at Carnegie Mellon University, the assignee of the present invention, a multidimensional model of multimedia objects including text, images, digital audio, and digital video was developed. With this model, developed during the Advanced Learning Technologies Project (the "ALT project"), variable granularity knowledge about the domain, content, image structure, and the appropriate use of the multimedia object is embedded with the object. Based on a history of current interactions (inputs and outputs), the system makes a judgement on what to display and how to display it. Techniques using such associated abstract representations have been proposed as mechanisms to facilitate searches of large digital video and audio spaces. The ALT Project is described in Stevens, Next Generation Network and Operating System Requirements for Continuous Time Media, Springer-Verlag, 1992, which is hereby incorporated herein by reference.

Moreover, simply searching for and viewing video clips from digital video libraries, while useful, is not enough. Once users identify video objects of interest, they must be able to manipulate, organize, and reuse the video. Demonstrations abound where students create video documents by the association of video clips with text. While such demonstrations are positive steps, the reuse of video should be more than simply editing a selection and linking it to text.

While some excellent tools are commercially available to edit digital video, there are currently no tools available to intelligently aid in the creative design and use of video though cinematic knowledge. One reason for the dearth of tools is the intrinsic, constant rate, temporal aspect of video. Another is complexities involved in understanding the nature and interplay of scene, framing, camera angle, and transition. Accordingly, the need exists to incorporate into any digital video editor intelligence with respect to cinematic knowledge. This would make possible context sensitive assistance in the reuse of video and its composition into new forms.

SUMMARY OF THE PRESENT INVENTION

The present invention is directed to a method and apparatus for creating a searchable digital video library and a system and method of using such a library which overcomes the many obstacles found in the prior art. The method includes the steps of transcribing audio data, marking the transcribed audio data with a first set of time-stamps and indexing the transcribed audio data. The steps of digitizing the video data and marking the digitized video data with a second set of time-stamps related to the first set of time-stamps are performed, prior to segmenting the digitized video data into paragraphs according to a set of rules. The method further includes the step of storing the indexed audio data and the digitized video data with their respective sets of time-stamps. The method may also include the step of passing the transcribed audio data through a natural language interpreter before indexing the transcribed audio data. The natural language interpreter updates the set of rules. The method may be practiced in a manner such that the digital library is automatically created.

The invention is also directed to an apparatus for creating a digital library from audio data and video images. The apparatus includes means for transcribing the audio data and marking the transcribed audio data with a first set of time-stamps, means for indexing the transcribed audio data, means for digitizing the video data and marking the digitized video data with a second set of time-stamps related to the first set of time-stamps, means for storing a set of rules and means for segmenting the digitized video data into paragraphs according to the stored set of rules. Additionally, means for storing the indexed audio data and the digitized video data with their respective sets of time-stamps is provided. The apparatus additionally includes a natural language interpreter for processing the transcribed audio data before the audio data is indexed and for updating the set of rules.

The present invention is also directed to a method and apparatus which utilizes natural language techniques to formulate searches used to retrieve information from the digital library. The search method may be implemented in a stand alone mode or in a network environment.

It is an object of the present invention to establish a system including a large, on-line, digital, video library which allows for full-content and knowledge-based search and retrieval via desktop computers and data communication networks. It is a further object of the present invention to develop a method for creating and organizing the digital video library. It is yet a further object of the invention to develop techniques for effectively searching and retrieving portions of the digital video library in view of the unique demands presented by multimedia systems.

It is a feature of the present invention that speech, natural language and image understanding technologies are integrated for the creation and exploration of the digital library. It is another feature of the present invention in that a high quality speech recognition function is provided. Yet another feature of the present invention that a natural language understanding system is provided for a full-text search and retrieval system. It is yet another feature of the invention that image understanding functions are provided for segmenting video sequences. Finally, it is another feature that the system is adaptable to various network architectures.

Advantages of the present invention are many. The digital video library system provides full-content search of, and retrieval from, an on-line database. Speech recognition functions provide a user-friendly human interface. Image understanding functions provide meaningful video segmentation based on context and not merely time. Multimode searching techniques provide for a more comprehensive and accurate search. Various network architectures support multiple users and increase searching efficiency. Finally, the ability to access unedited video permits the further exploitation of information. Those and other advantages and benefits will become apparent from the Detailed Description of the Preferred Embodiment hereinbelow.

BRIEF DESCRIPTION OF THE DRAWINGS

The various objects, advantages, and novel features of the present invention will be described, by way of example only, in the following detailed description, when read in conjunction with the appended drawings, in which.

FIG. A-1 is an example of a computer screen showing icons presented in response to a search request; and FIG. A-2 is an example of video paragraphing as defined in the present invention.

DETAILED DESCRIPTION OF THE PREFERRED EMBODIMENT

System Overview

Figure 1:
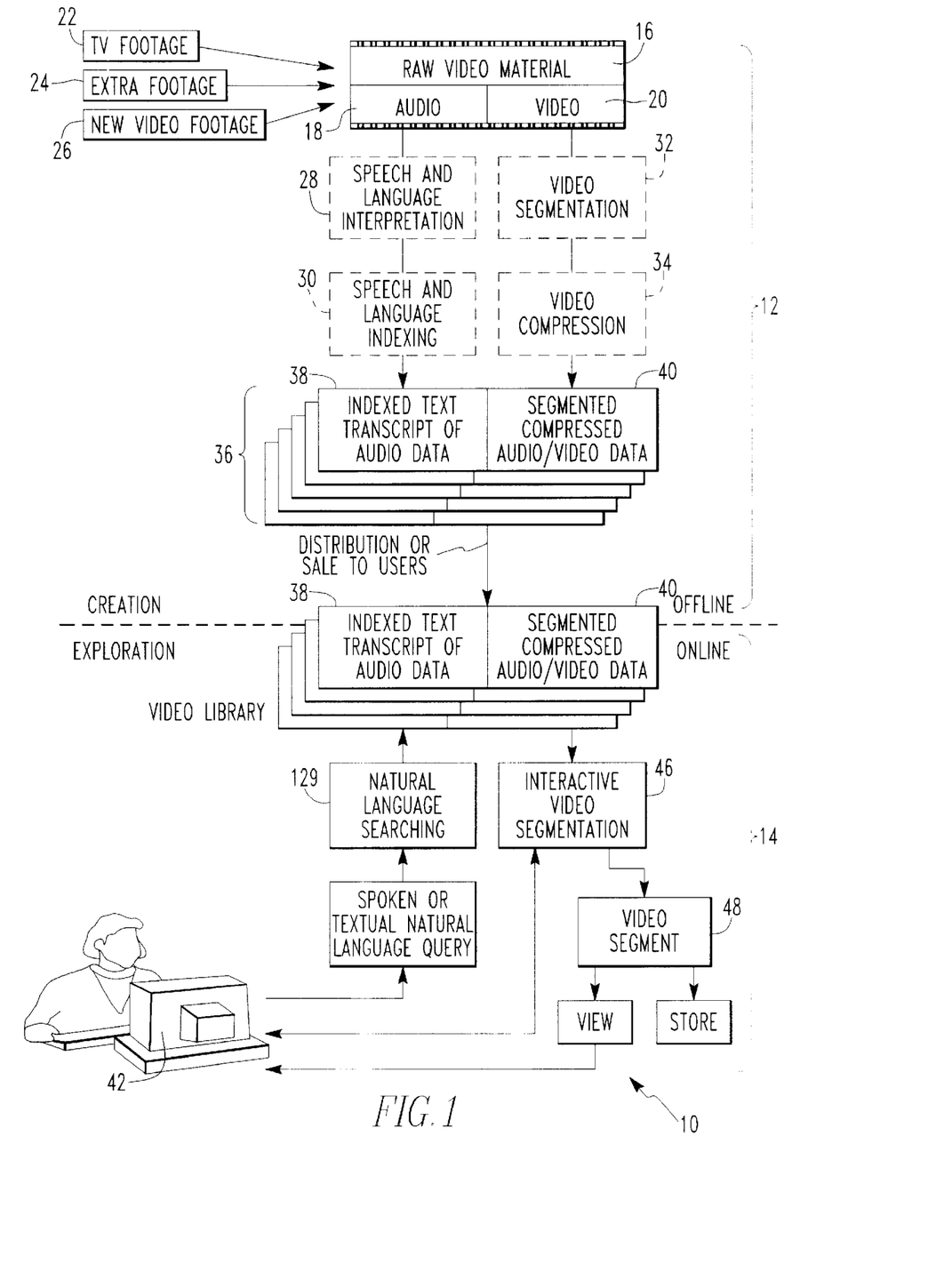
FIG. 1 is block diagram illustrating an overview of the method for creating a searchable, digital, video library and of a system for the use or exploration thereof according to the teachings of the present invention.

With reference to FIG. 1, there is shown an overview of a digital video library system, generally referred to by the numeral 10, constructed according to the present invention. Like reference numerals will be used among the various figures to denote like elements. In FIG. 1, the digital video library system 10 is shown to have two portions 12, 14. The offline portion 12 involves the creation of a digital library 36. The online portion 14 includes the functions used in the exploration of the digital library 36. As used herein, the term digital video library system 10 refers to the entire system, while the term digital library refers to the database 36 created by the offline portion 12.

The offline portion 12 receives raw video material 16 comprising audio data 18 and video data 20. The raw video material 16 may include audio-video from any one or a number of various sources. It is preferable that the raw video material 16 incorporates not only television footage 22, but also the unedited source materials, shown generally as extra footage 24, from which the television footage 22 was derived. Such extra footage 24 enriches the digital library 36 significantly such that the raw video material 16 may be used as reference resources and for uses other than those originally intended. The extra footage 24 also enlarges the amount of raw video material 16 significantly. For example, typical source footage runs fifty (50) to one hundred (100) times longer than the corresponding broadcast television footage 22. By way of further example, an interview with Arthur C. Clarke for the "Space Age" series, described in detail in the Operational Summary hereinbelow, resulted in two minutes of airtime even though over four hours of videotape were created during the interview. Finally, new video footage 26 not created for broadcast television may also be included.

Raw material could also include pure text, audio only, or video only.

The audio data 18 is subjected to the functions of speech and language interpretation 28 and speech and language indexing 30, each of which will be described in greater detail herein. The video data 20 is subjected to the functions of video segmentation 32 and video compression 34, which will also be described in greater detail herein. The resultant digital library 36 includes indexed, text transcripts of audio data 38, and segmented, compressed, audio/video data 40. The digital library may also include indexed text and segmented compressed video data. The digital library 36 is the output of the offline portion 12 of the digital video library system 10. It is the digital library 36 which is used by the online portion 14 and which, in a commercial environment, is accessed or otherwise made available to users.

Turning now to the online portion 14 of the digital video library system 10, the digital library 36 is made available to a user workstation 42. The workstation 42 preferably recognizes both voice commands and textual natural language queries, either of which will invoke a natural language search function 129. Through an interactive video segmentation function 46, video segments 48 are retrieved from digital library 36. The video segments 48 may be viewed at the workstation 42 and selectively stored for future use.

The reader will understand that the offline portion 12 of the system 10 may be implemented in software and run on a 150 MIPS DEC Alpha workstation or other similar machine to automatically generate the digital library 36.

Once the digital library 36 is created in accordance with the teachings of the present invention, it may be stored in any conventional storage media. The online portion 14 of the system 10 may be implemented in software and run on various different machines having access to digital library 36 through various network configurations as described hereinbelow. Alternatively, the "online" portion may be implemented in a standalone mode, although the networked environment would allow for much greater access to the digital library 36.

Creation of the Digital Library

Content is conveyed in both narrative (speech and language) and image. Only by the collaborative interaction of image, speech, and natural language understanding technology can the present invention automatically populate, segment, index, and search diverse video collections with satisfactory recall and precision our approach uniquely compensates for problems of interpretation and search in error-full and ambiguous data environments.

Image understanding plays a critical role in organizing, searching, and reusing digital video. The digital video library system 10 must annotate digital video automatically by speech and language understanding, as well as by using other textual data that has been associated with the video. Spoken words or sentences should be attached to their associated frames. The traditional database search by keywords, where images are only referenced, but not directly searched for, is not appropriate or useful for our digital library system 10. Rather, digital video itself must be segmented, searched for, manipulated, and presented for similarity matching, parallel presentation, and context sizing while preserving image content.

The integration of speech recognition, natural language processing, and image understanding technologies enables a digital library 36 to be created which supports the intelligent searching of large corpora of digital video and audio.

Audio Transcription & Time Stamping Function 27

Figure 2:
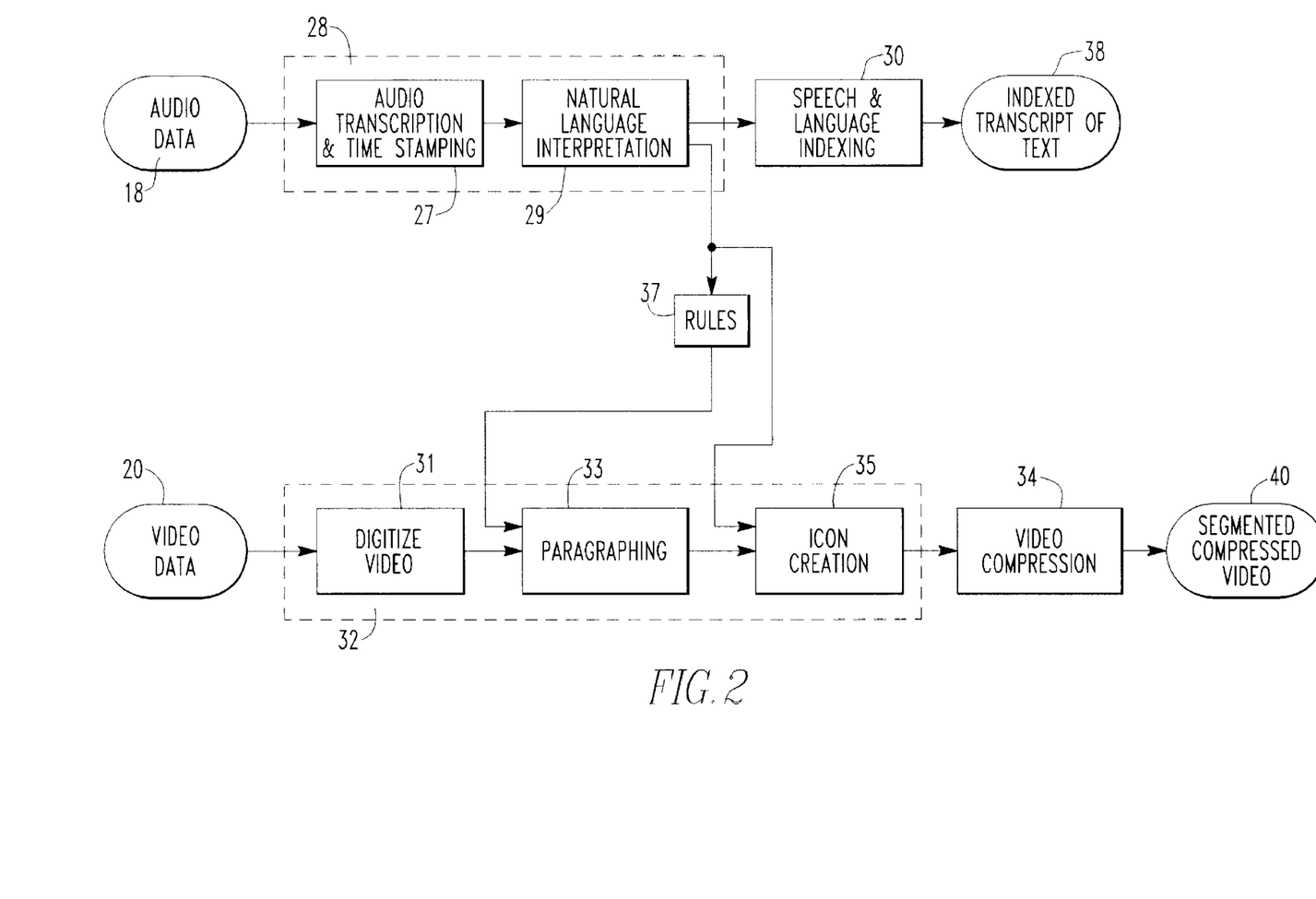
FIG. 2 is a flow chart illustrating the processing flow used for the creation of the digital video database.

With reference to FIG. 2, it is seen that the speech and language interpretation function 28 of FIG. 1 is implemented by an audio transcription and time stamping function 27 and a natural language interpretation function 29. The audio transcription portion of the audio transcription and time stamping function 27 operates on a digitized version of the audio data 18 using known techniques in automated speech recognition to transcribe narratives and dialogues automatically. For example, the Sphinx-II speech recognition system may preferably be used. The Sphinx-II system is a large-vocabulary, speaker-independent, continuous speech recognizer developed at Carnegie Mellon University. The Sphinx-II system currently uses a vocabulary of approximately 20,000 words to recognize connected spoken utterances from many different speakers. The Sphinx-II speech recognizer system is described in more detail in Huang, The SPHINX-II Speech Recognition System, An Overview, Computer and Speech Language, (1993) which is hereby incorporated herein by reference. However, as will be appreciated by those skilled in the art, other transcription methods may be employed, including human transcription or, in the case of closed captioned programs, merely using the captions from the programs as is. The transcript generated by the audio transcription portion of function 27 need not be viewed by users, and may be hidden therefrom.

Improvements in the error rate may be anticipated as much of the video footage useful for educational applications will typically be of high audio quality and will be narrated by trained professionals which facilitates lower error transcriptions. However, because of the anticipated size of video libraries, a larger vocabulary is anticipated. By itself, the video library's larger vocabulary may tend to degrade recognition rate and increase errors. In response, several innovative techniques have been developed and are exploited to reduce errors in the audio transcription function.

The use of program-specific information, such as topic-based lexicons and interest-ranked word lists are preferably employed by the audio transcription portion of function 27. Word hypotheses are improved by using known adaptive, "long-distance" language models. Moreover, multi-pass recognition processing is performed such that multi-sentence contexts may be considered.

Additionally, the transcript will be time-stamped by function 27 using any known technique for applying a time stamp. The audio time stamps will be aligned with timestamps associated with the processed video for subsequent retrieval as discussed below.

We expect our digital video library system 10 will tolerate higher error rates than those that would be required to produce a human-readable transcript. Also, on-line scripts and closed-captioning, where available, may preferably be used to provide base vocabularies for recognition and searchable texts.

Figure 3A:
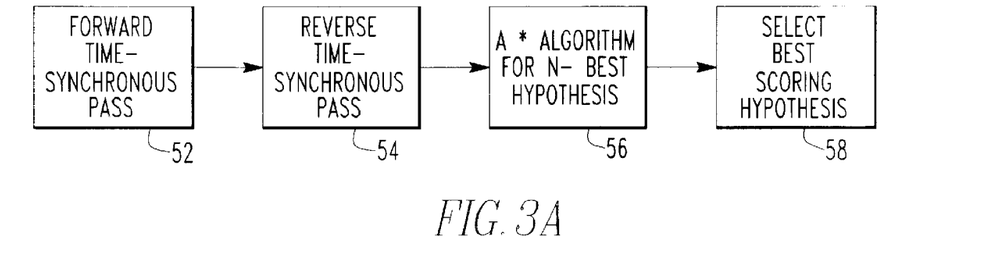
FIG. 3A is a flow chart illustrating one implementation of the audio transcription function illustrated in FIG. 2.

In a preferred embodiment, the audio transcription portion of function 27 generally processes an utterance in four known steps as illustrated in FIG. 3A. The first step, represented by box 52, is a forward time-synchronous pass using between-word senonic semi-continuous acoustic models with phone-dependent codebooks and a bigram language model. The forward time-synchronous pass function 52 produces a set of possible word occurrences, with each word occurrence having one start time and multiple possible end times. A reverse time-synchronous pass function 54 using the same system configuration is then performed. The result of the reverse time-synchronous pass function 54 is multiple possible begin times for each end time predicted in the forward time-synchronous pass 52. At step 56, an approximate A* algorithm is used to generate the set of N-best hypotheses for the utterance from the results of the forward time-synchronous pass 52 and reverse time-synchronous pass 54. Any one of a number of language models can be applied at step 56. We prefer that the default be a trigram language model. This approximate A* algorithm is not guaranteed to produce the best-scoring hypothesis first. Finally, at step 58, the best-scoring hypothesis is selected from among the N-best list produced. The best-scoring hypothesis is output from step 58 as the output from the audio transcription function 27. The time-stamped transcripts thus generated are passed to the natural language interpretation function 29 described below.

The audio transcription portion of function 27 may address many of the sources of error and variability which naturally arise. For example, with respect to the problem posed by multiple signal to noise ratios, the audio transcription function uses signal adaptation techniques, including preprocessing and early detection of signals, which automatically correct for such variability. With respect to the problem caused by the multiple unknown microphones, the audio transcription function may utilize dynamic microphone adaptation techniques to reduce the error without having to retrain for the new microphone. With respect to the problems associated with fluent speech, at present the only known technique is for manual adaptation of the lexicon using knowledgeable linguists. The audio transcription portion of function 27 may employ known expert system techniques to formulate a task domain based on the knowledge of such linguists so that automatic pronunciation learning can take place.

With respect to problems associated with expanded vocabularies, our research in long distance language models indicates that a twenty (20) to thirty (30) percent improvement in accuracy may be realized by dynamically adapting the vocabulary based on words that have recently been observed in prior utterances. In addition, most broadcast video programs have significant descriptive text available. These include early descriptions of the program design called treatments, working scripts, abstracts describing the program, and captions. In combination, those resources provide valuable additions to dictionaries used by the audio transcription function.

Because the creation portion 12 of the digital video library system 10 is typically performed off-line, processing time may be traded for higher accuracy, thereby permitting the use of larger, continuously expanding dictionaries and more computational intensive language models. We estimate that the error rates achievable by our techniques, even with the increased vocabulary requirements, will approach twelve (12) to fifteen (15) percent and, with advances in computer technology, search technology and speech processing techniques, five (5) to six (6) percent.

Natural Language Interpretation 29

Natural language processing is used in two parts of the digital video library system 10, in the offline portion 12 for creating a final transcript which is used in the creation of the indexed text transcription of audio 38, and in the online portion 14 for the formulation of natural language search queries 129, shown in FIG. 1. While existing retrieval research typically focuses on newspapers, electronic archives, and other sources of "clean" documents, natural language queries, as opposed to complex query languages, permit straight-forward description of the material described.

The natural language interpretation function 29 performs several known subfunctions. The first is called "summarization" 150 in FIG. 3B wherein, by analyzing the words in the audio track for each visual paragraph (the concept of a "visual paragraph" is described in the section entitled Content-Based Image Understanding hereinbelow), the subject area and theme of the narrative for that video paragraph is determined. Summarization may be used to generate headlines or summaries of each video paragraph or segment for use in the creation of icons, tables of contents, or indexing.

Figure 3B:
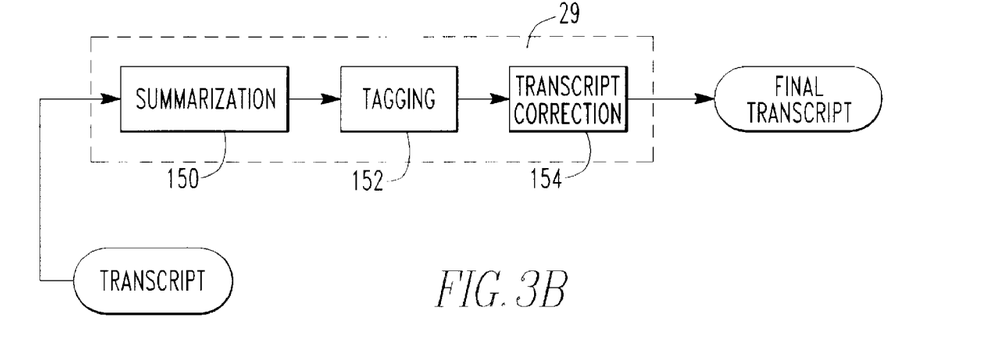
FIG. 3B is a flow chart illustrating one implementation of the natural language interpretation function illustrated in FIG. 2.

The second function is defined as "tagging" 152 wherein using data extraction techniques known in the art, the names of people, places, companies, organizations and other entities mentioned in the sound track may be determined. This will allow the user to find all references to a particular entity with a single query.

The third function is transcript correction 154. Using semantic and syntactic constraints, combined with a phonetic knowledge base, which may, for example, be the Sphinx-II dictionary or an analogous dictionary from another audio transcription function, recognition of certain errors and correction of such errors is achieved. Thus, the transcript correction function 154 is capable of automatically generating final transcripts of the audio with speech recognition errors corrected.

Our natural language interpreting functions 29, 129 are based on known techniques and may, for example, apply statistical techniques or expert systems. For example, a natural language interpreting function 29 is embodied in the Scout system developed at Carnegie Mellon University. Other natural language interpreters or processors are known in the art and may be employed therefor. The Scout system is a full-text information storage and retrieval system that also serves as a testbed for information retrieval and data extraction technology. The natural language interpretation function 29 may also be applied to the transcripts generated by the audio transcription and time stamping function 27 to identify keywords. Because processing at this point occurs offline, the natural language interpretation function 29 has the advantage of more processing time which fosters understanding and allows the correction of transcription errors.

Our natural language interpretation function 29 resolves several deficiencies in the art. First, the natural language interpretation function 29 enhances pattern matching and parsing to recover from and correct errors in the token string. Using the phonetic similarity measures produced by the audio transcription portion of function 27, a graded string similarity measure is used to retrieve and rank partial matches.

A baseline measurement system has been designed to address the issue of the inadequacy of current retrieval algorithms. We first document the retrieval algorithm's performance on transcribed video. A test collection of queries and relevant video segments from the digital library 36 are created. Using manual methods we establish the relevant set of video segments 48 from the digital library 36. We then use the test collection to evaluate the retrieval performance of our existing retrieval algorithms in terms of recall and precision.

The results of the baseline performance test may be used to improve the natural language interpretation function 29 by elaborating on current pattern sets, rules, grammars and lexicons to cover the additional complexity of spoken language by using large, data-driven grammars. To provide efficient implementation and high development rates, we use regular expression approximations to the context free grammars typically used for natural language. By extending this technique to an automatically recognized audio track, acceptable levels of recall and precision in video scene retrieval are realized.

The results of the baseline performance test may also be used to improve the audio transcription portion of function 27 so that basic pattern matching and parsing algorithms are more robust and function in spite of lower level recognition errors by using a minimal divergence criterion for choosing between ambiguous interpretations of the spoken utterance. For example, CMU's SCOUT text retrieval system uses a partial match algorithm to recognize misspelled words in texts.

We extend the existing algorithm to match in phonetic space as well as textual. For example, in one of our training videotapes, an Arthur Clarke interview, Clarke uses the phrase "self-fulfilling prophecies." In our early prototypes of the digital video library system 10, because of the limited vocabulary of the audio transcription portion of function 27, the audio transcription portion of function 27 created the term "self-fulfilling profit seize". To maintain high performance recall, video segments must be retrieved in spite of such mistranscriptions.

A natural language query is converted in phonetic space as follows:

Query: P R AA1 F AH0 S IY0 Z - "prophecy"

Data: P R AA1 F AH0 T S IY1 Z - "profit seize"

which deviate only by one insertion (T) and one change in stress (IY0 to IY1). Such a technique permits the retrieval of "self-fulfilling prophecies" and its phonetic equivalent of "self-fulfilling profit seize."

Boolean and vector-space models of information retrieval have been applied to the digital video library system 10. A test collection to measure recall and precision, and establish a base line performance level is also provided for evaluation of the digital video library system 10. Users are provided options for ordering the returned set of "hits," and for limiting the size of the hits as well.

As illustrated in FIG. 2, the use of the natural language interpretation function 29 extends to the paragraphing function 33 for the video data 20. A set of rules 37 are created and updated by the natural language interpretation function 27. Those rules 37 are applied to the paragraphing function 33. The paragraphing function 33 will be described in more detail herein below.

Also, the automatic summarization of retrieved material to build a module that assembles the video segment into a single user-oriented video sequence is provided by the natural language interpreter 29.

Speech and Language Indexing 30

Continuing with reference to FIGS. 1 and 2, the speech and language indexing function 30 is applied to the final transcript produced by the natural language interpretation function 29. The indexing function 30 uses techniques generally known in the art. For example, an inverted index is created containing each term and a list of all locations where such term is used. Pointers, i.e., the time stamps, to each occurrence of the term are provided for retrieval.

The speech and natural language indexing function 30 is also useful in providing a video skim capability. The video skim capability is the subject of a U.S. Patent Application entitled "System and Method for Skimming Digital Audio/ Video Data", being filed concurrently herewith in the names of Mauldin et al. ("Mauldin et al."), and which is hereby incorporated herein by reference. Both the instant application and the Mauldin et al. application are owned by the same entity.

The end result of the processing flow of the audio data 20 is the indexed transcript of text 38 which is stored in the digital library 36 for future use.

Content-Based Image Understanding

With reference to FIGS. 1 and 2, the video data 20 will be processed in parallel, and, in certain circumstances as will be noted herein, in interaction with, the processing of the audio data 18 described above. The first step is generally referred to herein as content based video segmentation, shown as the dashed-line box 32 in FIG. 2, which is made up of three functions. The first function is performed in step 31 and is the digitization of the video data 20. The digitizing function 31 is performed through techniques known by those skilled in the art.

The second function is the paragraphing function 33. The use of the paragraphing function 33 avoids the time-consuming, conventional procedure of reviewing a video file frame-by-frame around an index entry point. To identify paragraph boundaries, the paragraphing function 33 locates beginning and end points for each shot, scene, conversation, or the like by applying machine vision methods that interpret image sequences. The paragraphing function 33 is able to track objects, even across camera motions, to determine the limits of a video paragraph. The resulting paragraphing or segmentation process is faster, more precise, and more easily controlled than any previous manual method.

Each paragraph may be reasonably abstracted by a "representative frame," as is known, and thus be treated as a unit for context sizing or for an image content search. At least a portion of this task is done by content-independent methods that detect big "image changes", for example, "key frame" detection by changes in the Discrete Cosine Transform ("DCT") (compression) coefficient.

We prefer, however, to use content-based video paragraphing methods because the ultimate user is interested in content or subject retrieval, not simply image retrieval. The subject of video consists of both image content, textual content, and text transcripts of audio, the combination of which specifies the subject. The textual information attached is useful to quickly filter video segments locating potential items of interest. A subsequent visual query, referring to image content, is preferred. For example, queries such as "Find video with similar scenery," "Find the same scene with different camera motion," and "Find video with the same person," are important considerations from a user's perspective. Part of those queries may be realized by content-independent methods, such as histogram comparisons.

Current efforts in image databases, in fact, are mostly based on indirect image statistics methods. They fail to exploit language information associated with images or to deal with three dimensional events.

We use multiple methods, either separately or in combination, for the paragraphing function 33. The first method is the use of comprehensive image statistics for segmentation and indexing. This initial segmentation can be performed by monitoring coding coefficients, such as DCT, and detecting fast changes in them. This analysis also allows for identifying the key frame(s) of each video paragraph; the key frame is usually at the beginning of the visual sentence and is relatively static.

Once a video paragraph is identified, we extract image features such as color and shape and define those as attributes. A comprehensive set of image statistics such as color histograms and Kalman filtering (edge detection) is created. While these are "indirect statistics" to image content, they have been proven to be useful in quickly comparing and categorizing images, and will be used at the time of retrieval.

Figure 6:
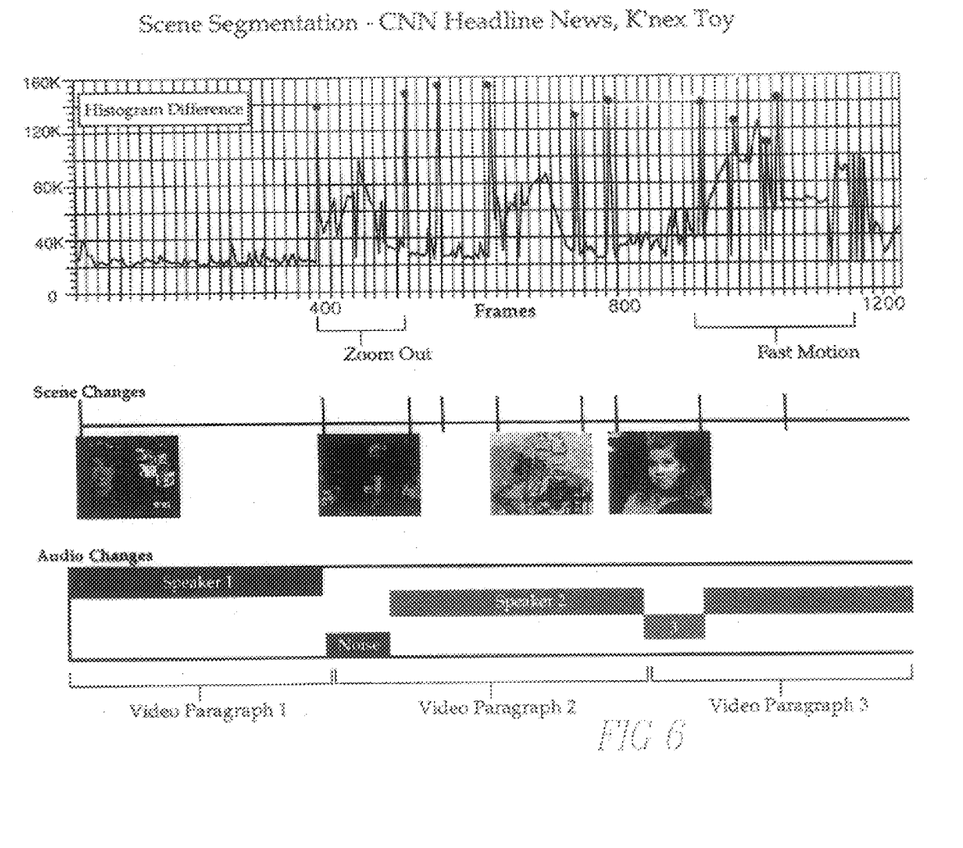
FIG. 6 is an example of the integration of several techniques involved in video segmentation.

We prefer the concurrent use of image, speech and natural language information. In addition to image properties, other cues, such as speaker changes, timing of audio and/or background music, and changes in content of spoken words can be used for reliable segmentation. FIG. 6 illustrates how the information previously identified may be used to increase the reliability of segmentation. As seen in FIG. 6, the coincidence in change in the histogram, scene change information, and audio information, combine to increase the reliability in determining the boundaries of video paragraph 1.

FIG. A-2 is an example where keywords are used to locate items of interest and then image statistics (motion) are used to select representative figures of the video paragraph. In this example, the words, "toy" and "kinex" have been used as keywords. The initial and closing frames have similar color and textual properties. Structural and temporal relationships between video segments can also be extracted and indexed.

The next integrated method to determine video paragraph boundaries is two-dimensional camera and object motion. With this method, visual segmentation is based on interpreting and following smooth camera motions such as zooming, panning, and forward camera motion. Examples include the surveying of large panoramic scene, the focusing of a viewer's attention on a small area within a larger scene, or a moving camera mounted on a vehicle such as a boat or airplane.

A more important kind of video segment is defined not by motion of the camera, but by motion or action of the objects being viewed. For example, in an interview segment, once the interviewer or interviewee has been located by speech recognition, the user may desire to see the entire clip containing the interview with this same person. This can be done by looking forward or backward in the video sequence to locate the frame at which this person appeared or disappeared from the scene.

We also prefer to incorporate developing techniques to track high degree-of-freedom objects, such as a human hand (27 degrees of freedom), based on "deformable templates" and the Extended Kalman Filtering method. Such a technique provides a tool to the video database to track and classify motions of highly articulated objects.

Segmenting video by appearance of a particular object or a combination object, known by those skilled in the art as "object presence", is also a powerful tool and we prefer to include methods for doing so. While this is difficult for a general three-dimensional object for arbitrary location and orientation, the technique of the KL Transform has proven to work to detect a particular class of object. Among object presence, human content is the most important and common case of object presence detection.

Finally, the techniques discussed so far are applicable to two-dimensional scenes, but video represents mostly three-dimensional shape and motion. Adding a three-dimensional understanding capability to the paragraphing function 33 greatly expands the abilities of the video segmentation function 32. The "factorization" approach, pioneered at Carnegie Mellon University, is used in our approach wherein in each image frame an "interest point" operator finds numerous corner points and others in the image that lend themselves to unambiguous matching from frame to frame. All the coordinates of these interest points, in all frames of the video sequence, are put into a large array of data. Based on a linear algebra theory, it has been proven that this array—whose rank is always equal to or less than 3—can be decomposed into shape and motion information, i.e., Observations=Shape×Motion.

Other rules 37 generated by the natural language interpretation function 29 may be useful to content-based paragraphing. For example, keywords of "football" and "scoreboard" may be used to identify scenes in a football game segmented by the showing of the scoreboard.

It will be understood by those skilled in the art that any of those methods may be employed in the paragraphing function 33, either separately or in combination with other methods, to meet the requirements of particular applications. Moreover, the present invention also provides the ability to segment based on time.

After the paragraphing function 33 is complete, icons are generated by function 35. Icons are a combination of text and video, either still or motion, which are created for subsequent presentation to the user performing a search. Visual icons are preferably a representative of a video paragraph or multiple contiguous video paragraphs relating to the same subject matter. Examples of icons retrieved in a search are shown in FIG. A-1.

Both still iconic and miconic representations of video information can easily mislead a user. For example, a search for video sequences related to transportation of goods during the early 1800's may return twenty (20) relevant items. If the first twenty (20) seconds of several sequences are "talking head" introductions, icons and micons provide no significant visual clue about the content of the video; the information after the introduction may or may not be interesting to the user. However, intelligent moving icons, imicons, overcome some of those limitations. Image segmentation technology creates short sequences that more closely map to the visual information contained in the video stream. Several frames from each new scene are used to create the imicon. This technique allows for the inclusion of all relevant image information in the video and the elimination of redundant data. See Mauldin et al.

For a video containing only one scene with little motion, a micon may be the appropriate representation. If video data contains a single scene but with considerable motion content, or multiple scenes, the imicon is preferred to display the visual content. To determine the imicon content, the optimal number of frames needed to represent a scene, the optimal frame rate, and the requisite number of scenes needed for video representation are determined. Heuristics for imicon creation are data dependent and take into account such factors as the number of unique scenes needed to represent a video chunk; the effect of camera movements and subject movements on the selection of images to represent each scene; and the best rate of presentation of images. Because the human visual system is adept at quickly finding a desired piece of information, the simultaneous presentation of intelligently created motion icons will let the user act as a filter to choose high interest material.

We prefer that process flow continues with the video compression function 34, although the video compression function 34 may occur at various positions within FIG. 2. The video compression function 34 may utilize any available commercial compression formats, for example, Intel's DVI® compression format, thus requiring only 10 Mbytes per source video minute to achieve VHS quality playback, i.e., 256×260 pixels. Other compression techniques may also be employed which, may, for example, be MPEG or MPEG-II. Using compression techniques, we anticipate that one terabyte of storage will hold over 1000 hours of segmented compressed video 40.

Exploration of the Digital Library

Interactive User Stations 42

The interactive user stations 42, see FIG. 1, are preferably instrumented to keep a global history of each session. That includes all of the original digitized speech from the session, the associated text as recognized by audio transcription portion of function 27, the queries generated by the natural language processing function 129 and the video objects returned, compositions created by users, and a log of all user interactions. In essence, the station 42 will be able to replay a complete session permitting both comprehensive statistical studies and detailed individual protocol analyses.

An initial query may be textual, entered either through the keyboard, mouse, or spoken words entered via microphone at workstation 42 and recognized by the online portion 14 of the system 10. Subsequent refinements of the query, or new, related queries may relate to visual attributes such as, "find me scenes with similar visual backgrounds." The natural language processing function 129 exemplified by the Scout program is used to process a query in much the same way as the natural language processing function 29 is used to process transcribed audio.

The interactive user stations 42 include the option to adjust the duration and information content of retrieved segments and to adjust the information playback rate as well as to adjust the media playback rate. When a search contains many hits, the system 10 will simultaneously present icons and imicons (full motion intelligently chosen sequences)

along with their text summarization. That is defined as parallel presentation. Functionality will be provided to enable the user to extract subsequences from the delivered segments and reuse them for other purposes in various forms and applications. Each will be described in greater detail below.

The interactive user station 42 allows the user to adjust the "size" (duration) of the retrieved video/audio segments for playback. Here, the size may be time duration, but more likely will be abstract chunks where information complexity or type will be the determining measure. The appropriate metaphors to use when the size the user is adjusting is abstract are chosen based on empirical studies. For example, it is well known that higher production value video has more shot changes per minute than, for example, a videotaped lecture. And although it is visually richer, it may be linguistically less dense. The unique balance of linguistic and visual information density appropriate for different types of video information is selected.

The interactive user station 42 allows the user to interactively control the rate of playback of a given retrieved segment, at the expense of both informational and perceptual quality. Video paragraphing will aid this process. By knowing where scenes begin and end, high speed scans of digital video segments 48 may be performed by presenting quick representations of scenes. This method is an improvement over jumping a set number of frames, since scene changes often reflect changes in organization of the video much like sections in a book. Empirical studies may be used to determine the rate of scene presentation that best enables user searches and the differences, if any, between image selection for optimal scans and image selection for the creation of imicons.

Once users identify video objects of interest, they need to be able to manipulate, organize and reuse the video. Even the simple task of editing is far from trivial. To effectively reuse video assets, the user needs to combine text, images, video and audio in new and creative ways. The tools may be developed for the user workstation 42 to provide expert assistance in cinematic knowledge to integrate the output of the content based video segmentation function 32 with the language interpretation function 28 to create semantic understanding of the video. For example, the contraposition of a high quality, visually rich presentation edited together with a selection from a college lecture on the same material may be inappropriate. However, developing a composition where the lecture material is available for those interested, but not automatically presented, may create a richer learning environment. With deep understanding of the video materials, it is possible to more intelligently assist in their reuse.

Data and Networking Architecture

Fundamental to providing continuous media from remote storage systems is the ability to sustain sufficient data rates from the file system and over the network to provide pleasing audio and video fidelity in terms of frame rate, size and resolution on playback for the receiving user. The ability to continuously transmit thirty (30) frames/second of full-color, full-screen, television quality images even to a single user is limited by network bandwidth and allocation. For current compression ratios yielding 10 Mbytes/min. of video, a minimum 1.3 Mbit/s dedicated link would be required to deliver continuous video. Those rates are not commonly achievable across the Internet. The ability to deliver the same video material simultaneously to a number of users is further limited by disk transfer rates.

Figure 4:
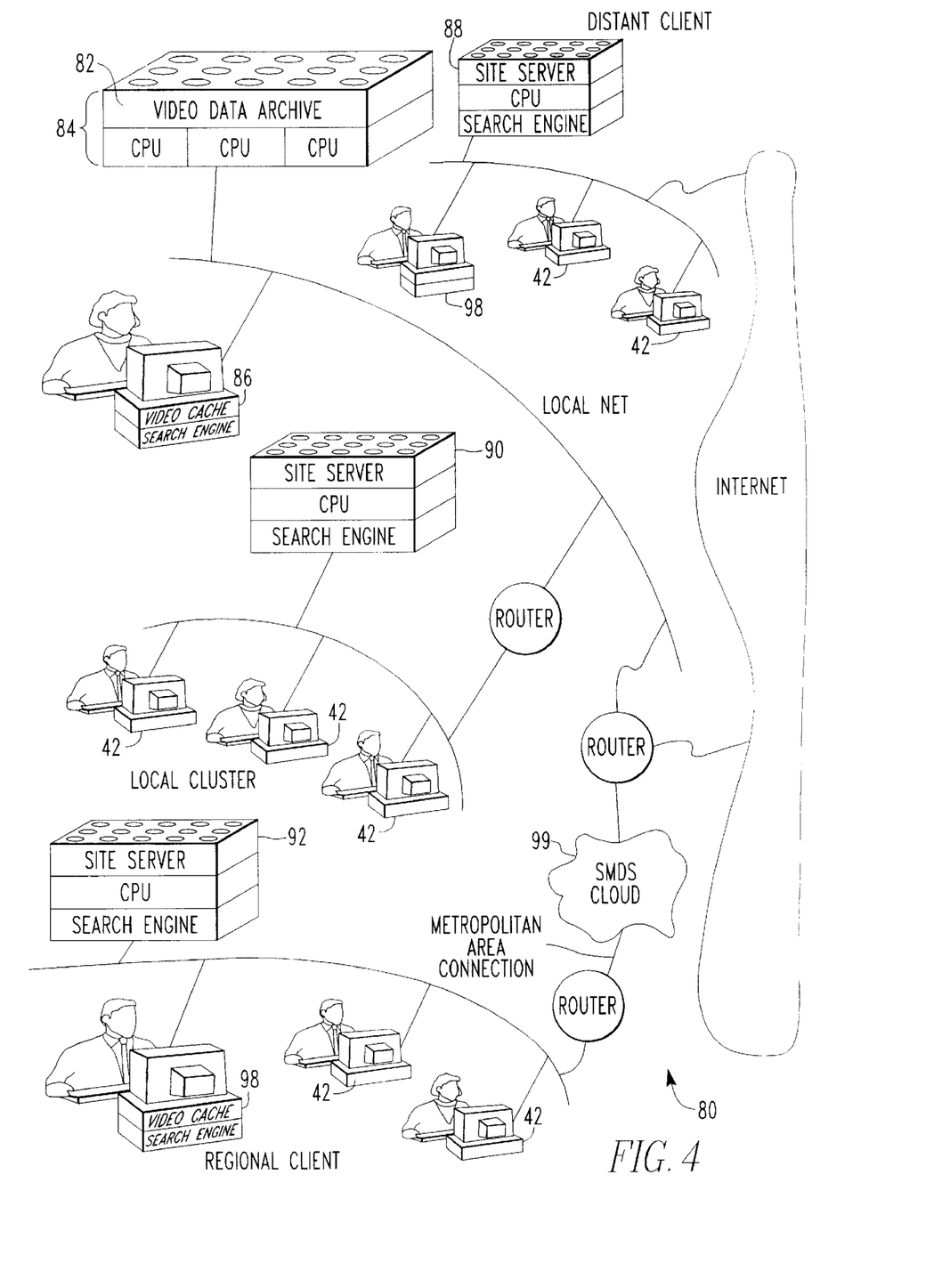
FIG. 4 is a schematic diagram illustrating one implementation of the data and networking architecture of the present invention.

With reference to FIG. 4, there is shown a preferred network architecture, generally referred to by the numeral 80. There is a digital video/audio archive 82 with a hierarchically cached file system, with all the digitized data at the top "media-server" node 84 and caches of most recently accessed media at the "site-server" nodes 88, 90, 92. We prefer that the top media server node 84 have a capacity of one (1) terabyte and each of the site-server nodes 88, 90 and 92 have a capacity of forty (40) to fifty (50) gigabytes. The top media-server node 84 is preferably implemented as a multi-threaded user-level process on a UNIX system, with a fixed priority policy scheduler which communicates continuous media data on standard network connections.

The "site-server" nodes 88, 90, 92 sit on a local area net with end-user local interactive user workstation 42. The searchable portions of the digital library 36, i.e., the transcripts and auxiliary indices, exist at the top media server node 84 and are replicated at each site. This permits the CPU-intensive searches to be performed locally, and media to be served either from the local cache at the site-servers 88, 90, 92 or from the top media server node 84. The local interactive user workstation 42 can either be a buffering display station, a display plus search engine, or the latter plus media cache 98 with a capacity of approximately 2 gigabytes, depending upon its size and performance class. Caching strategies will be implemented through standard file system implementations, for example Transarc's Andrew File System (AFS) and OSF's industry standard Distributed File System (DFS). Concentration of viewing strongly influences system architecture and thus is application dependent. Where and how much to cache depend on "locality of viewing."

The stringent continuous stream network data requirements typical for video-on-demand systems is relaxed in our library system implementation because (1) most sequences are anticipated to be short (less than two minutes), (2) many will be delivered from the locally networked site-server nodes 88, 90, 92, and (3) the data display is always performed from the buffer constituted by the user's local disk, typically 1–2 gigabytes in early system deployments. Currently used compression techniques reduce the data requirement to approximately 10 Mbytes/minute of video.

The digital video library system 10 is architecture independent such that forthcoming commercial file systems structured for delivery of continuous media and video-on-demand which addresses the problems of achieving sufficient server performance, including the use of disk striping on disk arrays to enable continuous delivery to large numbers of simultaneous viewers of the same material, may be incorporated when available. A one (1) to ten (10) terabyte archive 82 is representative of anticipated commercial environments.

The server network 80 may transmit to other sites via commercially available switched multi-megabit data service (SMDS) 99 at currently economically priced data rates (1.17 Mbits/sec). Frame relay services (not shown) from 56 Kbps to 1.5 Mbps are also provided for remote satellite services. Communication interfaces to interface local interactive user workstation 42 Ethernet to the SMDS clouds 99 are in place.

Figure 5:
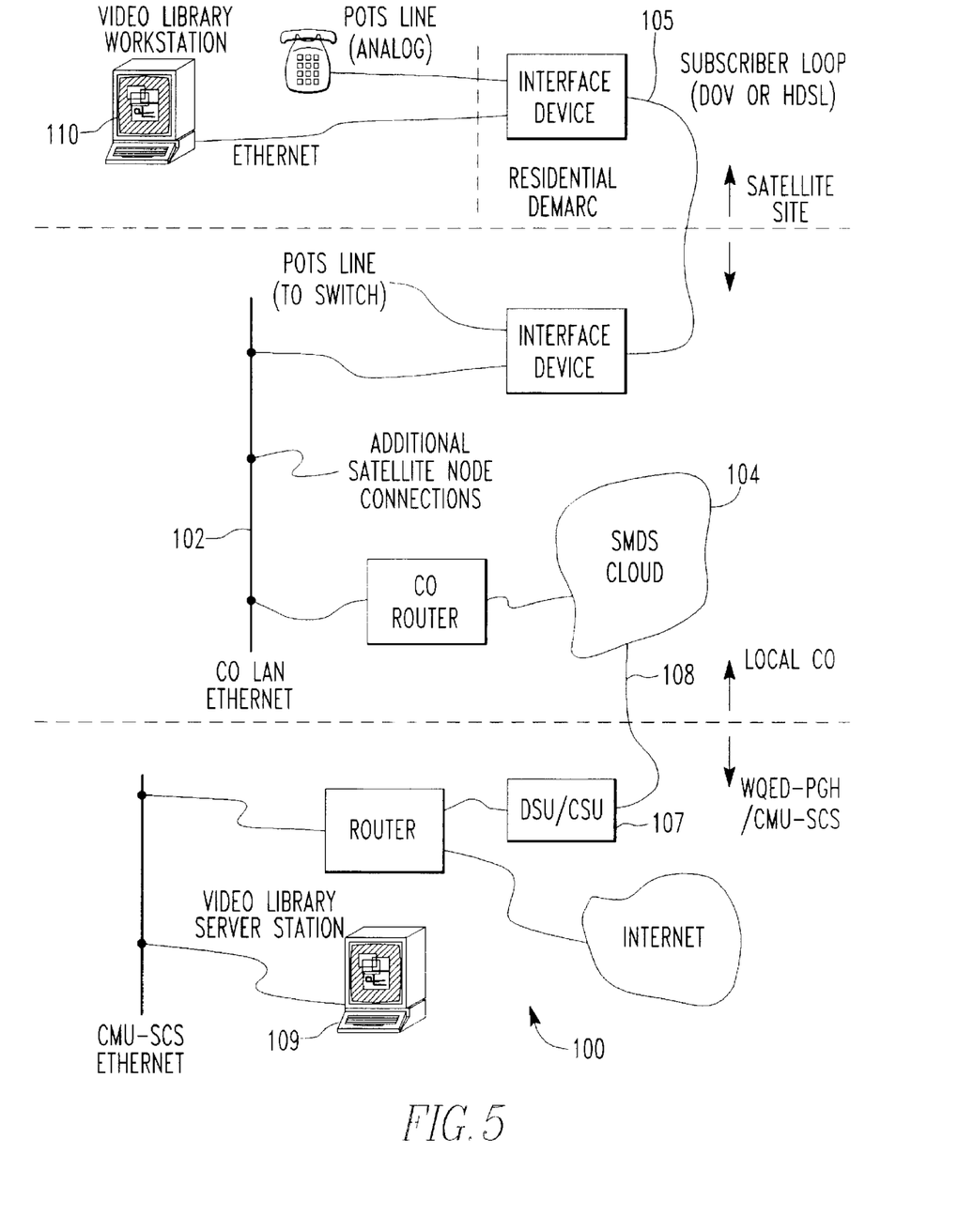
FIG. 5 is a schematic diagram illustrating one implementation of an on-line digital video library communication structure.

A key element of the on-line digital library is the communication fabric, shown schematically as 100 in FIG. 5, through which media-servers 109 and satellite (user) nodes 110 are interconnected. Traditional modem-based access over voice-grade phone lines is not adequate for this multimedia application. The fabric 100 preferably has the following characteristics. First, communication preferably is transparent to the user. Special-purpose hardware and software support is preferably minimized in both server and slave nodes. Second, communication services should preferably be cost effective, implying that link capability (bandwidth) be scalable to match the needs of a given node. Server nodes 107, for example, require the highest bandwidth because they are shared among a number of satellite nodes 110. Finally, the deployment of a custom communication network must be avoided. The most cost-effective, and timely, solution will build on communication services already available or in field-test. A tele-commuting Wide-Area Network (WAN) topology fabric 100 ideally suited for the on-line digital video library has been developed.

The topology of the WAN we use is shown in FIG. 5. Two elements of the communication fabric are (1) use of Central-Office Local-Area Networks (CO-LANs) 102 to provide unswitched data services to workstations over digital subscriber loop technology 105 and (2) use of a Switched Multi-Megabit Data Service (SMDS) "cloud" 104 to interconnect the CO-LANs 102 and high-bandwidth server nodes 107.

High-bandwidth server nodes 107 are directly connected into the SMDS cloud 104 through a standard 1.17 Mbit/s access line 108. The SMDS infrastructure provides for higher bandwidth connections (from 4 Mbit/s through 34 Mbit/s) should they be required.

OPERATIONAL SUMMARY

The following example explains the processing of the present invention in conjunction with a hypothetical search. It is assumed that the digital library 36 has been created by the offline portion 12.

Our student begins by speaking to the monitor, "I've got to put something together on culture and satellites. What are they?"

Transparent to the user, the user workstation 42 has just performed highly accurate, speaker independent, continuous speech recognition on her query. The online portion of 14 of digital library system 10 then applies sophisticated natural language processing functions 129 to understand the query and translate the query into retrieval commands to locate relevant portions of segmented compressed video 40. The segmented compressed video 40 is searched using the associated indexed transcripts of text 38. The appropriate selection is further refined through scene sizing developed by image understanding technology 32.

Appearing on the screen are several icons, some showing motion clips of the video contained, followed by text forming an extended title/abstracts of the information contained in the video (see FIG. A-2).

Making this possible, image processing helped select representative still images for icons and sequences from scenes for intelligent moving icons. Audio transcription functions 27 created transcripts which are used by the natural language function 29 to summarize and abstract the selections.

Through either a mouse or a spoken command, the student requests the second icon. The screen fills with a video of Arthur Clarke describing how he did not try to patent communications satellites, even though he was the first to describe them. Next the student requests the third icon, and sees villages in India that are using satellite dishes to view educational programming.

Asking to go back, Arthur Clarke reappears. Now, speaking directly to Clarke, she wonders if he has any thoughts on how his invention has shaped the world. Clarke, speaking from his office, starts talking about his childhood in England and how different the world was then. Using a skimming control she finds a particularly relevant section to be included in her multimedia composition.

Beyond the requisite search and retrieval, to give our student such functionality requires image understanding to intelligently create scenes and the ability to skim them. The skimming function is described in Mauldin et al.

The next day the student gives her teacher access to her project. More than a simple presentation of a few video clips, our student has created a video laboratory that can be explored and whose structure is itself indicative of the student's understanding.

Helping this student be successful are tools for building multimedia objects that include assistance in the language of cinema, appropriate use of video, and structuring composition. Behind the scenes the system has created a profile of how the video was used, distributing that information to the library's accounts.

While the present invention has been described in conjunction with preferred embodiments thereof, it will be understood that variations and changes in the details of the present invention as herein described and illustrated may be made by those skilled in the art without departing from the spirit, principle and scope of the present invention. Accordingly, it is expressly intended that all such equivalents, variations and changes therefrom which fall within the principle and scope of the present invention as described herein and defined in the claims be embraced thereby.

What is claimed is:

1. A method of creating an independent digital library from existing audio data and video images comprising the steps of:

transcribing said audio data and marking said transcribed audio data with a first set of time-stamps;

indexing said transcribed audio data;

digitizing said video data and marking said digitized video data with a second set of time-stamps related to said first set of time-stamps;

segmenting said digitized video data into video paragraphs according to a set of rules based upon scene characterization of said video images and the processing of said audio data; and storing said indexed audio data and said segmented digitized video data with their respective sets of time-stamps to create the digital library which can be accessed through said indexed audio data without returning to the existing audio data and video images.

2. The method of claim 1 additionally comprising the step of passing said transcribed audio data through a natural language interpreter before indexing said transcribed audio data.

3. The method of claim 2 wherein said natural language interpreter updates said set of rules.

4. An apparatus for creating an independent digital library from existing audio data and video images, comprising:

means for transcribing said audio data and marking said transcribed audio data with a first set of time-stamps;

means for indexing said transcribed audio data;

means for digitizing said video data and marking said digitized video data with a second set of time-stamps related to said first set of time-stamps;

means for storing a set of rules based upon scene characterization of said video images and the processing of said audio data;

means for segmenting said digitized video data into video paragraphs according to said stored set of rules; and means for storing said indexed audio data and said segmented digitized video data with their respective sets of time-stamps to create the digital library which can be accessed through said indexed audio data without returning to the existing audio data and video images.

5. The apparatus of claim 4 additionally comprising natural language interpreter means for processing said transcribed audio data before said data is indexed.

6. The apparatus of claim 4 wherein said natural language interpreter means updates said set of rules.

7. The method of claim 1 additionally comprising the step of generating a set of icons after segmenting said digitized video data into video paragraphs according to said set of rules.

8. The method of claim 7 wherein said set of icons is a set of intelligent moving icons.

9. The method of claim 8 wherein said set of intelligent moving icons is generated using data-dependent heuristics.

10. The method of claim 1 additionally comprising the step of compressing said digitized video data before storing said indexed audio data and said digitized video data with their respective sets of time-stamps.

11. The method of claim 1 wherein the step of transcribing said audio data and marking said transcribed audio data with a first set of time stamps includes the steps of:

producing a set of possible word occurrences, with each word occurrence having a start time and a plurality of possible end times;

producing a plurality of possible begin times for each of said end times;

generating a set of N-best hypotheses for said audio data; and selecting a best-scoring hypothesis from said set of N-best hypotheses to produce said transcribed audio data.

12. The method of claim 11 wherein said set of possible word occurrences is produced using a forward time synchronous pass function.

13. The method of claim 11 wherein said plurality of possible begin times are produced using a reverse time synchronous function.

14. The method of claim 2 wherein the step of passing said transcribed audio data through a natural language interpreter before indexing said transcribed audio data includes the steps of:

summarizing said transcribed audio data;

tagging said transcribed audio data using data extraction techniques; and correcting said tagged transcribed audio data using semantic and syntactic constraints and a phonetic knowledge base.

15. The method of claim 1 wherein said digitized video data are segmented into video paragraphs using comprehensive image statistic rules.

16. The method of claim 1 wherein said digitized video data are segmented into video paragraphs using camera motion rules.

17. The method of claim 1 wherein said digitized video data are segmented into video paragraphs using object motion rules.

18. The method of claim 1 wherein said digitized video data are segmented into video paragraphs using deformable templates and filtering rules.

19. The method of claim 1 wherein said digitized video data are segmented into video paragraphs using object presence rules.

20. The method of claim 1 wherein said digitized video data are segmented into video paragraphs using three-dimensional understanding rules.

21. The apparatus of claim 4 additionally comprising means for generating a set of icons after said digitized video data is segmented into paragraphs according to said set of rules.

22. The apparatus of claim 21 wherein said set of icons is a set of intelligent moving icons.

23. The apparatus of claim 22 wherein said means for generating said set of intelligent moving icons uses data-dependent heuristics.

24. The apparatus of claim 4 additionally comprising means for compressing said digitized video data before said indexed audio data and said digitized video data are stored with their respective sets of time-stamps.

25. The apparatus of claim 4 wherein said means for transcribing said audio data and marking said transcribed audio data with a first set of time stamps comprises:

means for producing a set of possible word occurrences, with each word occurrence having a start time and a plurality of possible end times;

means for producing a plurality of possible begin times for each of said end times;

means for generating a set of N-best hypotheses for said audio data; and means for selecting a best-scoring hypothesis from said set of N-best hypotheses to produce said transcribed audio data.

26. The apparatus of claim 25 wherein said means for producing said set of possible word occurrences uses a forward time synchronous pass function.

27. The apparatus of claim 25 wherein said means for producing said plurality of possible begin times uses a reverse time synchronous function.

28. The apparatus of claim 5 wherein said means for passing said transcribed audio data through a natural language interpreter before indexing said transcribed audio data comprises:

means for summarizing said transcribed audio data;

means for tagging said transcribed audio data using data extraction techniques; and means for correcting said tagged transcribed audio data using semantic and syntactic constraints and a phonetic knowledge base.

29. The apparatus of claim 4 wherein said means for segmenting said digitized video data into video paragraphs uses comprehensive image statistic rules.

30. The apparatus of claim 4 wherein said means for segmenting said digitized video data into video paragraphs uses camera motion rules.

31. The apparatus of claim 4 wherein said means for segmenting said digitized video data into video paragraphs uses object motion rules.

32. The apparatus of claim 4 wherein said means for segmenting said digitized video data into video paragraphs uses deformable templates and an filtering rules.

33. The apparatus of claim 4 wherein said means for segmenting said digitized video data into video paragraphs uses object presence rules.

34. The apparatus of claim 4 wherein said means for segmenting said digitized video data into video paragraphs uses three-dimensional understanding rules.

* * * * *